US008855916B2

(12) United States Patent
Meredith et al.

(10) Patent No.: US 8,855,916 B2
(45) Date of Patent: Oct. 7, 2014

(54) COMPARISON OF MULTI-DIMENSIONAL DATASETS

(71) Applicant: AT&T Mobility II LLC, Atlanta, GA (US)

(72) Inventors: Sheldon Meredith, Marietta, GA (US); Mark Pack, Irving, TX (US); John Pastore, Suwanee, GA (US)

(73) Assignee: AT&T Mobility II, LLC, Atlanta, GA (US)

( * ) Notice: Subject to any disclaimer, the term of this patent is extended or adjusted under 35 U.S.C. 154(b) by 0 days.

(21) Appl. No.: 14/064,678

(22) Filed: Oct. 28, 2013

(65) Prior Publication Data

US 2014/0067843 A1 Mar. 6, 2014

Related U.S. Application Data

(63) Continuation of application No. 13/308,003, filed on Nov. 30, 2011, now Pat. No. 8,594,921.

(51) Int. Cl.

| | |
|---|---|
| ***G01C 21/26*** | (2006.01) |
| ***G01C 21/32*** | (2006.01) |
| ***H04W 64/00*** | (2009.01) |
| ***H04W 4/02*** | (2009.01) |
| ***G06F 17/10*** | (2006.01) |
| ***G06F 17/30*** | (2006.01) |

(52) U.S. Cl.
CPC ......... *G06F 17/30241* (2013.01); *H04W 4/022* (2013.01); *G06F 17/10* (2013.01); *H04W 4/021* (2013.01)
USPC ........................................ 701/408; 455/456.1

(58) Field of Classification Search
None
See application file for complete search history.

(56) References Cited

U.S. PATENT DOCUMENTS

| | | | | |
|---|---|---|---|---|
| 6,721,652 | B1 * | 4/2004 | Sanqunetti | 701/468 |
| 2010/0017855 | A1 * | 1/2010 | Johnson et al. | 726/4 |
| 2011/0231453 | A1 * | 9/2011 | Johnson et al. | 707/803 |
| 2012/0303743 | A1 * | 11/2012 | Stonefield et al. | 709/217 |
| 2012/0309409 | A1 * | 12/2012 | Grosman et al. | 455/456.1 |
| 2013/0045760 | A1 * | 2/2013 | Obermeyer et al. | 455/456.6 |
| 2013/0079028 | A1 * | 3/2013 | Klein | 455/456.1 |

* cited by examiner

*Primary Examiner* — James Trammell
*Assistant Examiner* — Demetra Smith-Stewart
(74) *Attorney, Agent, or Firm* — Wolff & Samson

(57) ABSTRACT

Methods, systems, and apparatuses for comparing multi-dimensional datasets are provided. A multi-dimensional dataset comparison includes receiving a plurality of datasets, each including a plurality of coordinates, wherein a subset of coordinates defines a geo-fence. For a coordinate within a geo-fence of one of the plurality of datasets, determining analogous coordinates in each of the other datasets, the analogous coordinates defining a coordinate input set, and performing in parallel an operation on the coordinate input set to determine whether an entry is present at a coordinate of the coordinate input set.

20 Claims, 4 Drawing Sheets

COMPARISON OF MULTI-DIMENSIONAL DATASETS

This application is a continuation of U.S. patent application Ser. No. 13/308,003, filed Nov. 30, 2011, the disclosure of which is herein incorporated by reference in its entirety.

TECHNICAL FIELD

This specification relates generally to multi-dimensional datasets, and more particularly to methods for performing calculations regarding geo-fences represented within multi-dimensional datasets.

BACKGROUND

A geo-fence is a virtual perimeter (e.g., on a geographic area) that can be any shape, such as a rectangle defined by four points, a circle defined by a center and a radius, or a complex polygon. A geo-fence can be defined by a network operator, service provider, enterprise or customer/subscriber. For example, service providers may define geo-fences corresponding to subscriber locations, while subscribers may define their own geo-fences based on customized preferences.

In a telecommunications network, a mobile communication device can respond to entering or leaving an area bound by a geo-fence. The mobile communication device may respond with a notification, by executing an application, or by interacting with hardware associated with a geo-fence. For example, geo-fences can be used to notify parents of children leaving designated areas, shut down a vehicle before entering a restricted area, and notify authorities when a person or object of interest enters or exits a sensitive location.

SUMMARY

Methods, apparatuses and articles of manufacture for comparing coordinates of multi-dimensional datasets are provided. In one embodiment, a plurality of datasets, each including a plurality of coordinates, are received, wherein a subset of coordinates defines a geo-fence. For a coordinate within a geo-fence of one of the plurality of datasets, analogous coordinates in each of the other datasets are determined, the analogous coordinates defining a coordinate input set. An operation is performed in parallel on the coordinate input set to determine whether a data signal is present at a coordinate of the coordinate input set. The operation can be at least one of a logical or mathematical operation.

In accordance with an embodiment, the geo-fence is based on one of a spatial, facility-based, event-based, multi-dimensional and geographical parameter, and a status parameter associated with the geo-fence, such as a time, location or motion-based parameter, may be dynamically updated.

In accordance with an embodiment, a data signal present at a coordinate of the coordinate input set is determined to be associated with an entity, and information associated with the entity can be determined.

In accordance with an embodiment, a first dataset includes a subscriber geo-fence and a second dataset includes one of a service provider and enterprise geo-fence.

These and other advantages of the present disclosure will be apparent to those of ordinary skill in the art by reference to the following detailed description and the accompanying drawings.

DETAILED DESCRIPTION

Figure 1:
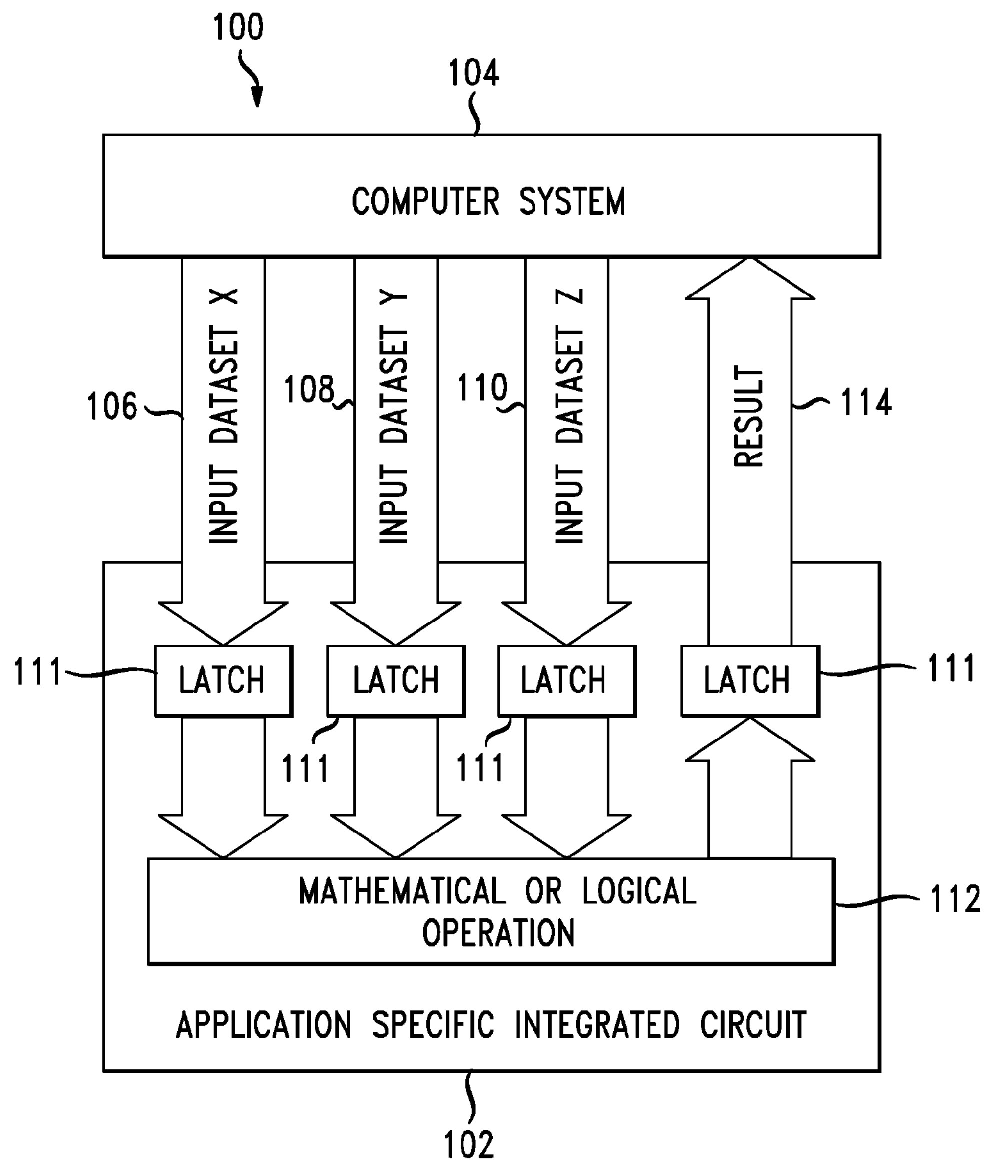
FIG. 1 illustrates a computer system for comparing coordinates of multi-dimensional datasets in accordance with an embodiment.

Methods, apparatuses and articles of manufacture for executing a parallel mathematical or logical operation on analogous coordinates of multi-dimensional datasets are disclosed. A dataset comprises a plurality of coordinates. A coordinate of a dataset digitally represents a physical location. The coordinates of multi-dimensional datasets may digitally represent physical locations that relate to specific applications. For example, physical locations digitally represented by coordinates of multi-dimensional datasets may include the geographic locations of mobile network subscribers, related (e.g., chain) stores, sensitive installations (e.g., government facilities), landmarks or the like.

A geo-fence (i.e., a virtual perimeter that may be a rectangle, circle, or complex polygon) may be represented by a subset of coordinates of a dataset. In telecommunications applications, geo-fences may correspond to service provider, enterprise or subscriber locations, preferences and events. A geo-fence may be represented by a static subset of coordinates (e.g., to represent a perimeter around a base station), or a dynamic subset of coordinates that change based on a corresponding entity or event (e.g., to represent a perimeter around a mobile subscriber unit or concert venue).

For example, a business owner may define a geo-fence around a business location. The business owner may want to identify subscribers who are in the vicinity of the business for statistical reasons or to send them a discount coupon when they are in close proximity. In addition, the business owner may have multiple business locations. Therefore, identifying subscribers who are in the vicinity of all of the business locations (i.e., geo-fences) can require knowing the real-time location of every potential customer relative to each location.

In another example, an enterprise having a large number of mobile customers (e.g., 100 million) may wish to determine in real-time whether any one of those mobile customers is within any of a plurality of geo-fence boundaries. Currently, software may allow computer systems to determine whether the locations of the customers and the geo-fences match, and if so, to take some pre-defined action. However, there can be thousands or even millions of pre-defined geo-fences for businesses and government entities. Further, other types of geo-fences may now be defined by mobile subscribers for their own purposes (e.g., such as for social networking or “arriving and leaving” type triggers that may pertain, for example, to a child arriving at school or home). Dynamic geo-fences allow every mobile subscriber to have a personal (i.e., motion-based) geo-fence. Therefore, the number of geo-fences included in current and future telecommunications systems may number well above one hundred million (100 M). As such, these systems may require comparing 100 M+ mobile customers in real time to 100 M+ pre-defined geo-fences.

The embodiments relate to determining whether an entry, such as an entry representing a mobile device, at a coordinate of a dataset is presently located at a coordinate analogous to a coordinate within a geo-fence of another dataset. In particular, the embodiments relate to determining a reduced set of coordinates within a dataset for further geo-fencing calculations (e.g., entity identification, notifications, etc.). As such, the embodiments provide pre-processing for high-volume geo-fencing calculations, such as those involving multi-dimensional datasets, dynamically updating geo-fences and other variables.

FIG. 1 illustrates a system for comparing coordinates of multi-dimensional datasets in accordance with an embodiment. The system 100 includes application specific integrated circuit (ASIC) 102 and computer system 104. For example, computer system 104 may be a centralized memory location (e.g., a processor connected to a local database) or distributed data collection center (e.g., a processor connected to a remote base station) in a telecommunications network.

ASIC 102 is configured to receive inputs related to a plurality of datasets from computer system 104, such as via an input/output interface (not shown). In one embodiment, ASIC 102 determines analogous coordinates between datasets. For example, a coordinate representing a physical location in one dataset (e.g., a service provider dataset) may be analogous to a coordinate representing the same physical location in another dataset (e.g., a subscriber dataset). Therefore, while each dataset can be directed to a specific application, the analogous coordinates can be evaluated to determine whether an entry (e.g., representing a mobile device) is present at a location relevant to any of the datasets (e.g., within a geo-fence).

ASIC 102 can receive data related to analogous coordinates from computer system 104. For example, ASIC 102 may be configured to receive entries related to one or more coordinates such as xi 106, yi 108, and zi 110, where xi, yi and zi are analogous coordinates (from datasets x, y and z) defining a coordinate input set (i). ASIC 102 may be configured to latch the coordinate input set into memory 111 as input for an operation.

ASIC 102 can evaluate the coordinate input set by performing an operation such as a mathematical or logical function 112. For example, the mathematical or logical function 112 may be a logical 'AND' operation for determining whether an entry (e.g., representing an object or subscriber) is present at a coordinate of the coordinate input set. Alternatively, ASIC 102 may execute a logical function 112 for determining whether an entry is present at one coordinate of the coordinate input set, but not at another of the coordinates.

In one embodiment, the mathematical or logical function 112 may be performed in parallel for every coordinate of a coordinate input set to permit faster processing for large numbers of coordinates. For example, ASIC 102 may be in communication with hardware connected directly to remote memory locations (e.g., base stations) for performing in parallel mathematical or logical function 112.

ASIC 102 may communicate the result 114 of the mathematical or logical function 112 to computer system 104. For example, result 114 may indicate that an entry at a coordinate of one dataset is within a geo-fence of another dataset. Computer system 104 may then use the result 114 for further processing and calculations (e.g., to identify an entity associated with an entry, to send notifications to the entity or to another element, or to send data transmissions, metrics, etc.).

Figure 2:
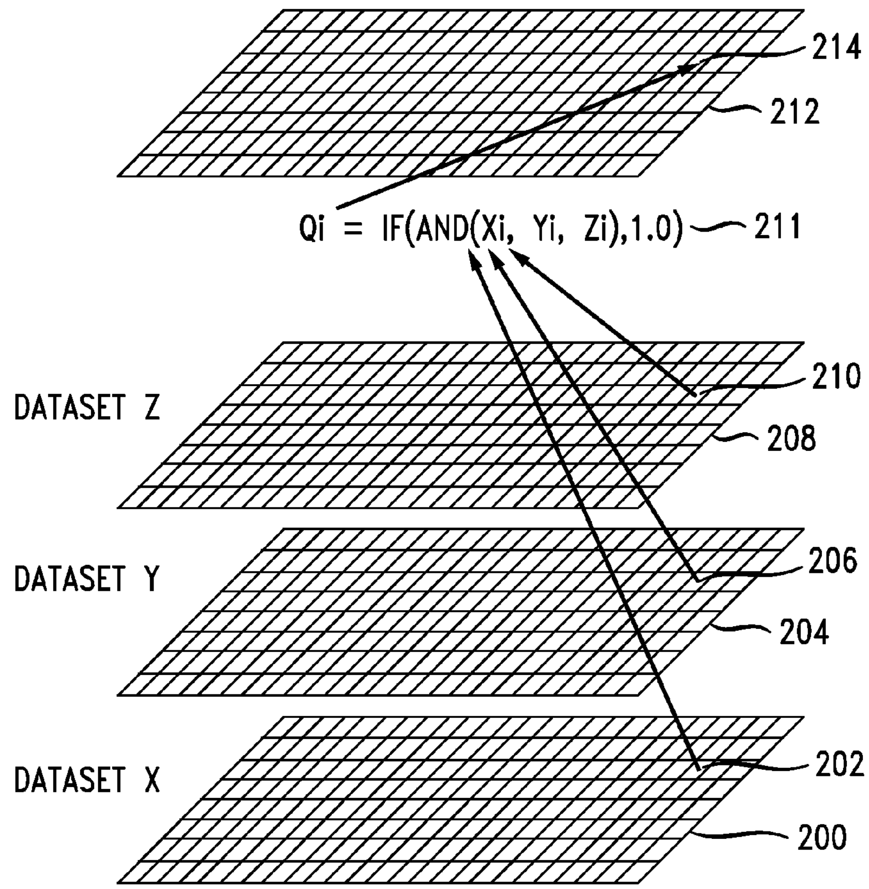
FIG. 2 is a diagram showing analogous coordinates of multi-dimensional datasets in accordance with an embodiment.

FIG. 2 is a diagram showing analogous coordinates of multi-dimensional datasets in accordance with an embodiment. For ease of understanding, FIG. 2 illustrates datasets as a series of two-dimensional grids. Specifically, FIG. 2 shows three, two-dimensional input dataset grids: dataset X 200 having a coordinate 202, dataset Y 204 having a coordinate 206, and dataset Z 208 having a coordinate 210. As shown, coordinates 202, 206, and 208 are analogous and comprise a coordinate input set.

In one embodiment, ASIC 102 may receive a plurality of input datasets (having an arbitrary number of dimensions and coordinates) and may execute a plurality of mathematical or logical operations pertaining to the plurality of input datasets. For example, ASIC 102 may execute logical function 211 (e.g., Qi=IF(AND(Xi, Yi, Zi), 1, 0)) to determine a result Qi for analogous coordinates 202, 206, and 208 of datasets X, Y, and Z. For example, result Qi 214 in the output dataset grid 212 is a logical '1' if an entry is present at each of Xi, Yi and Zi. Otherwise, result Qi 214 is a logical '0'.

Figure 3:
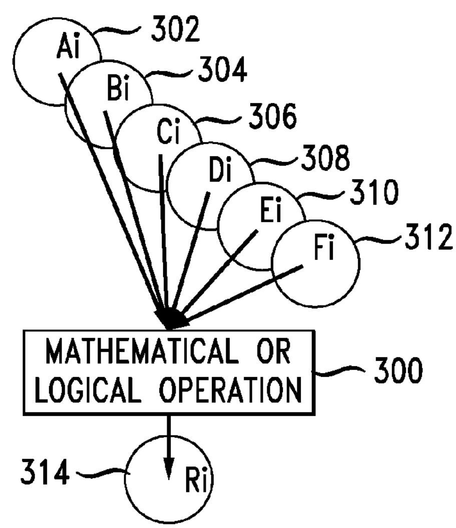
FIG. 3 is a diagram of an operation for comparing analogous coordinates of multi-dimensional datasets in accordance with an embodiment.

A coordinate input set also can be depicted as a cluster of memory cells, as shown in FIG. 3. FIG. 3 is a diagram of an operation for comparing analogous coordinates of multi-dimensional datasets in accordance with an embodiment. For example, ASIC 102 may execute mathematical or logical function 300 based on a cluster of memory cells, indicated as Ai 302, Bi 304, Ci 306, Di 308, Ei 310 and Fi 312, where "i" indicates that the memory cells represent a set of analogous coordinates found in a plurality of datasets. ASIC 102 may then determine an output value Ri 314 corresponding to the input values. In one embodiment, the mathematical or logical function can be performed in parallel for all input and output coordinates, "i." For example, the mathematical or logical function associated with a memory cell may be performed in the immediate physical proximity of the associated memory cell.

Figure 4:
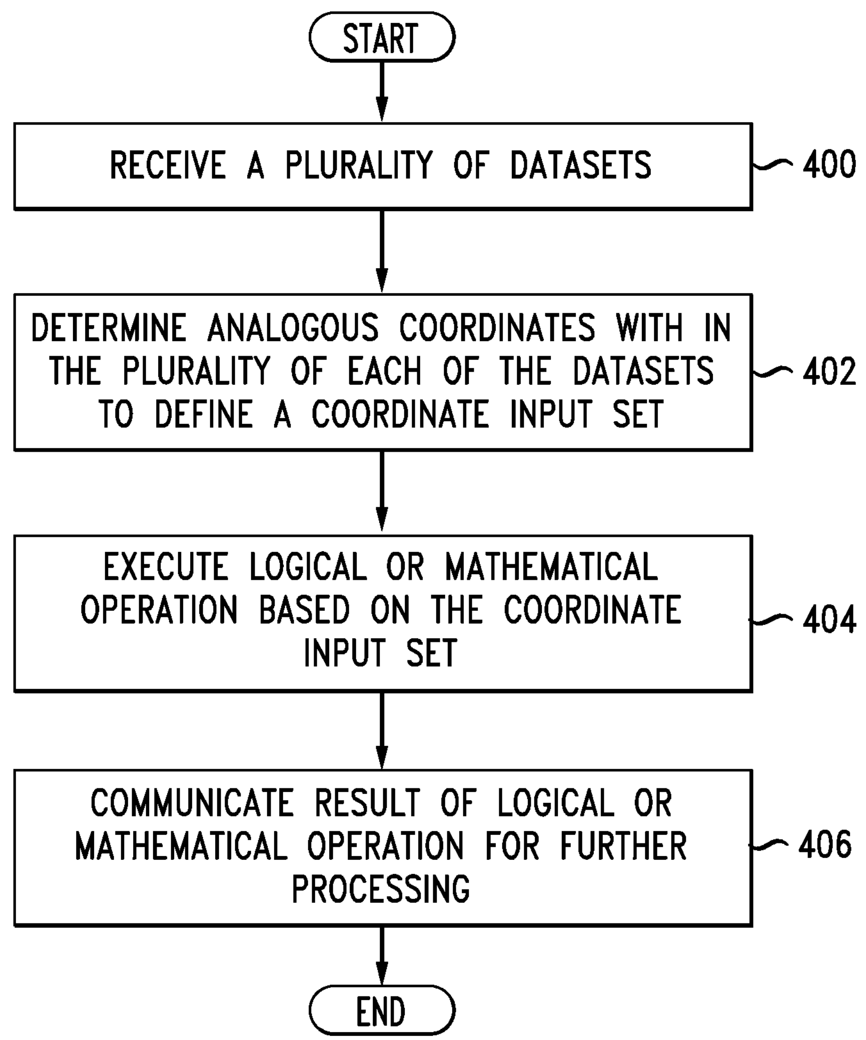
FIG. 4 is a flowchart of a process for comparing analogous coordinates of multi-dimensional datasets in accordance with an embodiment.

FIG. 4 is a flowchart of a process for comparing multi-dimensional datasets in accordance with an embodiment. In one embodiment, ASIC 102 may comprise a processor and an interface for performing one or more of the steps of FIG. 4. At 400, a plurality of datasets are received (e.g., via an interface of ASIC 102), wherein each of the plurality of datasets comprises a plurality of coordinates, and wherein a subset of one or more coordinates defines a geo-fence. A geo-fence may be defined by a single coordinate of a dataset or may be defined by a plurality of coordinates (e.g., to represent a rectangle, circle, or complex polygon-shaped geo-fence). For example, a geo-fence can be based on one of a spatial, facility-based, event-based, multi-dimensional and geographical parameter. Further, a dataset or coordinates defining a geo-fence may be dynamically updated, activated or deactivated based on a status parameter, such as one or more time, location or motion-based parameters. For example, datasets, (and geo-fences) may be dynamically updated to represent the motion of entities, mobile device/subscriber activities (e.g., addition or removal from a subscriber list or location), events, temporal factors and other parameters.

At 402, for a coordinate within a geo-fence of one of the plurality of datasets, analogous coordinates in each of the other datasets are determined (e.g., by a processor of ASIC 102), the analogous coordinates defining a coordinate input set. An operation may then be performed to determine whether an entry is present at a coordinate of the coordinate input set at 404. For example, a request regarding a particular coordinate of a coordinate input set may be received (e.g., to determine if an entry is present). In such case, a logical or mathematical operation may be performed in parallel for a relevant subset of coordinates to determine whether an entry is present.

At 406, the result of the operation may be communicated via an interface of ASIC 102 for further processing. For example, if the result indicates that an entry at a coordinate of one dataset is at a coordinate analogous to a coordinate within a geo-fence (i.e., subset of coordinates) of another dataset, the result 114 may then be used for determining an entity identification, to send notifications, data transmissions, metrics, or for other functions. In addition, if the result indicates that no entries are at a particular coordinate, no further operations need be performed at any analogous coordinates.

In one embodiment, a mathematical or logical operation may allow for operations on larger datasets (e.g., datasets having a million or more coordinates in each dimension) to be performed in a reduced amount of time. For example, a large dataset may be a battlefield firing platform. When a battlefield firing platform achieves a firing solution, it is desirable to determine whether any friendly forces coincide with the coordinates of the firing solution. As such, the known locations of friendly forces can be used to define a set of geo-fences, and the geo-fences can be automatically, dynamically, and rapidly compared to the firing solution dataset to look for a collision based on the mathematical or logical operation. If a collision exists (e.g., the operation determines that a data signal is present at a coordinate analogous to a coordinate within the firing solution), firing would be inhibited. If no collision exists, no further operations are necessary. Other implementations may include marine applications to prevent ship collisions with known underwater obstacles, air traffic control applications allowing for three dimensional comparisons (e.g., for collision avoidance with both fixed obstacles, such as buildings and terrain, as well as dynamic obstacles such as other aircraft), and applications regarding image matching.

In various embodiments, the method steps described herein, including the method steps described in FIG. 4, may be performed in an order different from the particular order described or shown. In other embodiments, other steps may be provided, or steps may be eliminated, from the described methods.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be used within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the method steps described herein, including one or more of the steps of FIG. 4. Certain steps of the methods described herein, including one or more of the steps of FIG. 4, may be performed by a server or by another processor in a network-based cloud-computing system. Certain steps of the methods described herein, including one or more of the steps of FIG. 4, may be performed by a client computer in a network-based cloud computing system. The steps of the methods described herein, including one or more of the steps of FIG. 4, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIG. 4, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 5:
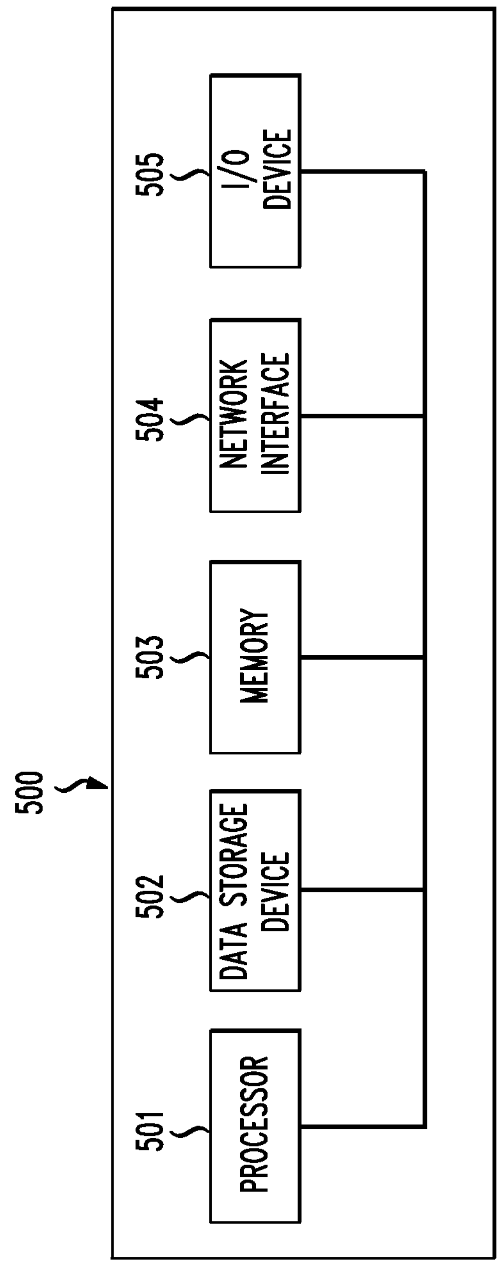
FIG. 5 is a high-level block diagram of an exemplary computer that may be used for comparing coordinates of multi-dimensional datasets.

A high-level block diagram of an exemplary computer that may be used to implement systems, apparatus and methods described herein is illustrated in FIG. 5. Computer 500 includes a processor 501 operatively coupled to a data storage device 502 and a memory 503. Processor 501 controls the overall operation of computer 500 by executing computer program instructions that define such operations. The computer program instructions may be stored in data storage device 502, or other computer readable medium, and loaded into memory 503 when execution of the computer program instructions is desired. Thus, the method steps of FIG. 4 can be defined by the computer program instructions stored in memory 503 and/or data storage device 502 and controlled by the processor 501 executing the computer program instructions. For example, the computer program instructions can be implemented as computer executable code programmed by one skilled in the art to perform an algorithm defined by the method steps of FIG. 4. Accordingly, by executing the computer program instructions, the processor 501 executes an algorithm defined by the method steps of FIG. 4. Computer 500 also includes one or more network interfaces 504 for communicating with other devices via a network. Computer 500 also includes one or more input/output devices 505 that enable user interaction with computer 500 (e.g., display, keyboard, mouse, speakers, buttons, etc.).

Processor 501 may include both general and special purpose microprocessors, and may be the sole processor or one of multiple processors of computer 500. Processor 501 may include one or more central processing units (CPUs), for example. Processor 501, data storage device 502, and/or memory 503 may include, be supplemented by, or incorporated in, one or more application-specific integrated circuits (ASICs) and/or one or more field programmable gate arrays (FPGAs).

Data storage device 502 and memory 503 each include a tangible non-transitory computer readable storage medium. Data storage device 502, and memory 803, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 805 may include peripherals, such as a printer, scanner, display screen, etc. For example, input/output devices 505 may include a display device such as a cathode ray tube (CRT) or liquid crystal display (LCD) monitor for displaying information to the user, a keyboard, and a pointing device such as a mouse or a trackball by which the user can provide input to computer 500.

Any or all of the systems and apparatus discussed herein, including ASIC 102, computer system 104, and components thereof, may be implemented using a computer such as computer 500.

One skilled in the art will recognize that an implementation of an actual computer or computer system may have other structures and may contain other components as well, and that FIG. 5 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present disclosure and that various modifications may be implemented by those skilled in the art without departing from the scope and spirit of this disclosure. Those skilled in the art could implement various other feature combinations without departing from the scope and spirit of this disclosure.

We claim:

1. A method comprising:

receiving a plurality of datasets, each comprising a plurality of coordinates;

determining, for a coordinate of one of the plurality of datasets, analogous coordinates in each other of the plurality of datasets, the analogous coordinates defining a reduced coordinate input set;

performing, by a processor, a first operation on the reduced coordinate input set to determine whether an entry is present at a coordinate of the reduced coordinate input set, wherein the first operation defines a pre-processing calculation; and automatically determining whether to perform a second operation associated with the reduced coordinate input set based on the pre-processing calculation.

2. The method of claim 1, wherein the first operation is a logical operation.

3. The method of claim 1, wherein the second operation is a collision avoidance operation.

4. The method of claim 1, further comprising dynamically updating a status parameter associated with the plurality of datasets.

5. The method of claim 4, wherein the status parameter is a time-based parameter.

6. The method of claim 1, further comprising:

determining an entity associated with an entry present at a coordinate of the reduced coordinate input set; and determining information associated with the entity.

7. The method of claim 1, wherein the first operation is a mathematical operation.

8. The method of claim 1, wherein the second operation is an image matching operation.

9. An apparatus comprising:

an interface for receiving a plurality of datasets, each including a plurality of coordinates;

a processor; and a computer readable memory to store computer program instructions for comparing multi-dimensional datasets, the computer program instructions, when executed on the processor, cause the processor to perform operations comprising:

determining, for a coordinate of one of the plurality of datasets, analogous coordinates in each other of the plurality of datasets, the analogous coordinates defining a reduced coordinate input set;

performing a first operation on the reduced coordinate input set to determine whether an entry is present at a coordinate of the reduced coordinate input set, wherein the first operation defines a pre-processing calculation; and automatically determining whether to perform a second operation associated with the reduced coordinate input set based on the pre-processing calculation.

10. The apparatus of claim 9, wherein the first operation is a logical operation.

11. The apparatus of claim 9, wherein the second operation is a collision avoidance operation.

12. The apparatus of claim 9, the operations further comprising dynamically updating a status parameter associated with the plurality of datasets.

13. The apparatus of claim 12, wherein the status parameter is a location-based parameter.

14. The apparatus of claim 9, the operations further comprising:

determining an entity associated with an entry present at a coordinate of the reduced coordinate input set; and determining information associated with the entity.

15. A computer readable medium storing non-transitory computer program instructions for comparing multi-dimensional datasets, which, when executed on a processor, cause the processor to perform operations comprising:

receiving a plurality of datasets, each including a plurality of coordinates;

determining, for a coordinate of one of the plurality of datasets, analogous coordinates in each other of the plurality of datasets, the analogous coordinates defining a reduced coordinate input set;

performing a first operation on the reduced coordinate input set to determine whether an entry is present at a coordinate of the reduced coordinate input set, wherein the first operation defines a pre-processing calculation; and automatically determining whether to perform a second operation associated with the reduced coordinate input set based on the pre-processing calculation.

16. The computer-readable medium of claim 15, wherein the first operation is a mathematical operation.

17. The computer-readable medium of claim 15, wherein the second operation is an image matching operation.

18. The computer-readable medium of claim 15, the operations further comprising dynamically updating a status parameter associated with the plurality of datasets.

19. The computer-readable medium of claim 18, wherein the status parameter is a motion-based parameter.

20. The computer-readable medium of claim 15, the operations further comprising:

determining an entity associated with an entry present at a coordinate of the reduced coordinate input set; and determining information associated with the entity.

* * * * *